Patented Nov. 17, 1942

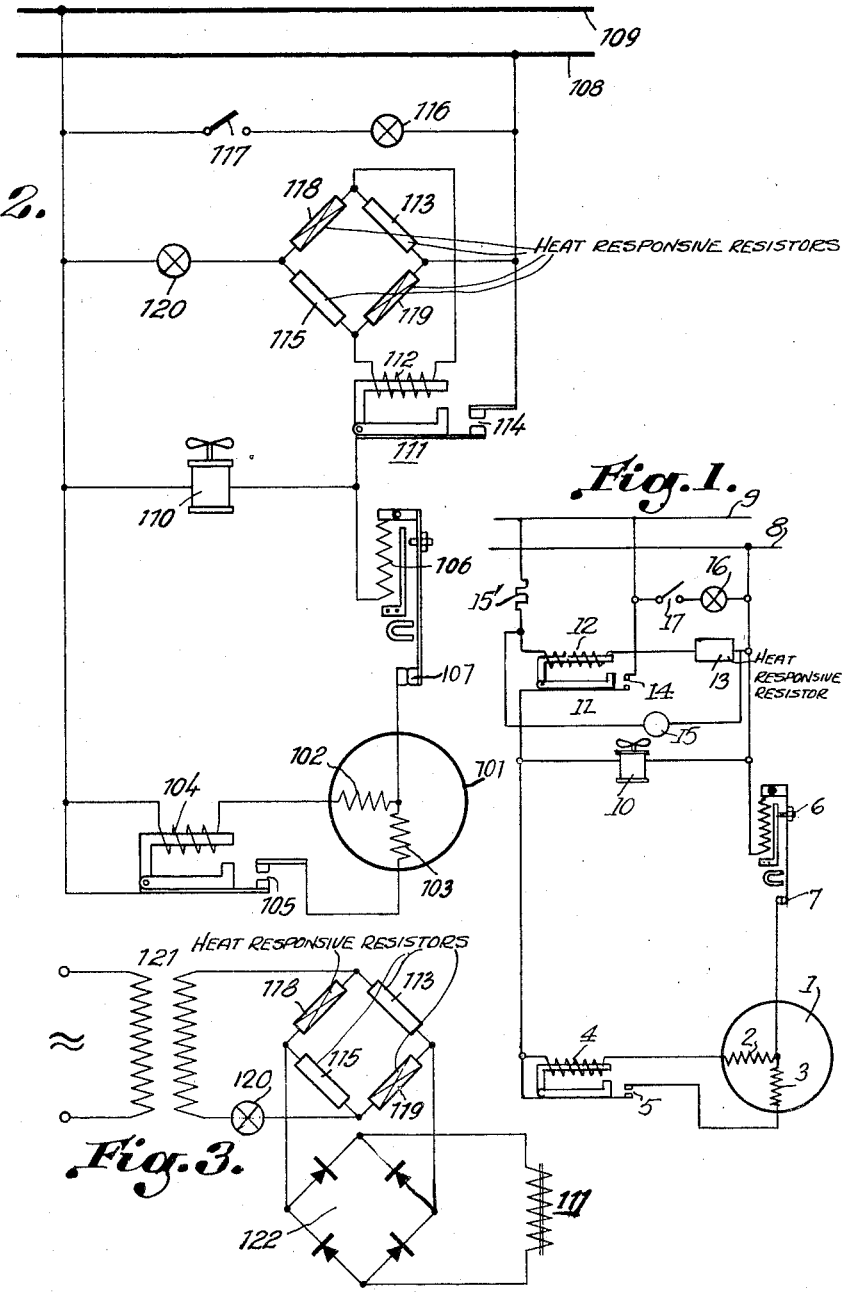

2,302,320

UNITED STATES PATENT OFFICE 2,302,320

REFRIGERATING APPARATUS

Rudolf Hintze, Berlin-Charlottenburg, and Wilhelm Lehfeldt, Berlin-Siemensstadt, Germany; vested in the Alien Property Custodian Application August 12, 1939, Serial No. 289,860
In Germany August 1, 1938

7 Claims. (Cl. 62—4)

This invention relates to a system for controlling the power source of a refrigerating apparatus in response to the temperature of a part of the refrigerator.

To control the energy source of refrigerating apparatus thermostatic devices have been used in which a fluid, by varying its pressure, effects the desired switching operations in accordance with the changes in temperature of a part, for instance the evaporator, of the refrigerating apparatus. It has been attempted to substitute these hydraulic thermostats by more readily adjustable electric devices. The known electric thermostats contain a bimetallic member. Such thermostats present certain drawbacks and may cause false switching operations.

An object of the present invention is to remove these drawbacks. To this end, according to the invention, a temperature-responsive resistor, inserted in the circuit of a relay for controlling the power source of the refrigerating apparatus, serves as a temperature-responsive means.

Temperature-responsive resistors have been employed for different purposes; for instance, to release protective circuit breakers upon the occurrence of overloads or when the temperature increases above a predetermined value. In other known systems, resistors with a negative temperature coefficient serve to start motors and to attenuate current surges. It has already been proposed to regulate the temperature in an electrically heated chamber with the aid of temperature-responsive resistors. This system, however, is complicated in that it requires a rheostat for varying the resistance of the heating element, a control relay, two further relays for controlling said rheostat, and a bridge connection.

Another object of the invention, as compared with the last-mentioned system, is to simplify the control arrangement and to render it more economical and reliable in operation.

According to the invention, the temperature-responsive resistor is inserted in the circuit in such a manner that it influences, in accordance with the changes in resistance, a control relay, for instance, a quick action switch which switches on and off the power source when a predetermined maximum and minimum temperature of the evaporator has been attained. The temperature-responsive resistor is preferably arranged in direct heat contact with the evaporator in a similar manner as in the case of the known hydraulic temperature-responsive means. In systems in which the voltage of the supply circuit is subjected to wide voltage fluctuations, a neon discharge lamp may be inserted to advantage in the circuit of the temperature-responsive resistor to maintain constant the voltage drop across the resistor and the control relay for preventing the voltage fluctuations from disturbing the desired control operation. As temperature-responsive means, such resistors are preferably employed whose resistance varies erratically at a certain temperature so that, for instance, when a given evaporator temperature falls below a predetermined value, the relay armature drops out to disconnect the power source of the refrigerating apparatus. Accordingly, when a predetermined temperature is exceeded, the relay armature is again attracted and the power source is put into operation owing to the sudden decrease in resistance occurring with increasing temperature.

The invention will be fully understood from the following description of the embodiments exemplified by the drawings in which Figs. 1 and 2 show the circuit diagrams of two different control systems according to the invention, while Fig. 3 represents a modified detail for a control system otherwise similar to that of Fig. 2. The systems illustrated relate to refrigerating apparatus of the compression type, hence the power source to be controlled consists of the electric motor operating the compressor.

In Fig. 1, I denotes the compressor motor having a main phase winding 2, and an auxiliary or split-phase winding 3 serving to facilitate the starting, 4 denotes the auxiliary phase relay whose operation depends upon the current in the main phase winding 2. When starting the set, the relay 4 is operated by the high current flowing in the main phase winding 2 so that the relay contact 5 inserts the auxiliary phase winding 3 in the circuit. As soon as the current in winding 2 drops to a predetermined value the contacts 5 are opened and the auxiliary phase winding 3 is deenergized. 6 is an overload-responsive circuit breaker which, upon the attainment of a predetermined maximum value of the current, opens its contact 7 to disconnect the compressor motor I from the supply circuit 8, 9. A blower 10 which, during the operation, supplies cooling air to the condenser and compressor of the refrigerating apparatus (not shown), is connected in parallel relation to the compressor motor. A relay 11, designed preferably in the form of a quick acting switch, serves to switch on and off the motors 1 and 10. The exciting winding 12 of this relay is series-connected to the temperature-responsive resistor 13 which is preferably in direct heat contact with the evaporator (not shown) of the refrigerating apparatus. The series connection consisting of the energizing winding 12 and the temperature-responsive resistor 13 is set so that the changes in resistance of the resistor 13 occuring with decreasing temperature release the control relay 11 whose contact 14 opens as soon as the temperature drops below a predetermined value, whereas when the evaporator temperature exceeds a predetermined value the motor circuit is closed again by the contact 14. 16 is a lamp arranged in the refrigerator cabinet and 17 denotes the corresponding switch.

If supply circuits are involved in which the voltage fluctuates within wide limits, a neon discharge lamp 15 is preferably inserted in the circuit of the temperature-responsive resistor as is indicated in Fig. 1. The neon lamp, in connection with a series resistor 15', takes care that the voltage drop across resistor 13 and relay winding 12 remains constant irrespective of voltage fluctuations in the supply network 8, 9.

If the temperature-responsive resistor is connected to the supply circuit without the use of voltage-regulating means, the unavoidable voltage fluctuations influence the operating values of the control switch or relay. However, these voltage fluctuations may also be neutralized in a simple manner by a bridge arrangement as described in the following. The energizing winding of the switch or relay controlling the power source of the refrigerator may be connected to a bridge arrangement containing one or two temperature-responsive resistors. In this case, the control system is preferably chosen so that the switch when deenergized opens the circuit of the refrigerating apparatus. The bridge connection serving to compensate for the voltage fluctuation may be directly connected to the supply circuit. In systems in which the refrigerating apparatus is connected to an alternating-current source, the bridge connection is connected with the source through a transformer or a series-resistor in order to prevent the refrigerating apparatus from being supplied with the high voltage of the supply circuit. In order to operate an alternating current system with the smallest possible current consumption, a direct-current relay may be connected through rectifiers to the bridge arrangement.

Fig. 2 shows a system in which a bridge arrangement is employed. 101 denotes the compressor motor, 102 its main phase winding, and 103 its auxiliary or split-phase winding. 104 denotes the auxiliary phase relay whose operation depends upon the current flowing in the main phase winding and which inserts the auxiliary phase winding 103 upon the closure of its contact 105. As soon as the current in winding 102 drops below a predetermined value, the contacts 105 cut off the auxiliary winding 103. 106 is a motor-operated mechanism which opens its contact 107, when the current exceeds a predetermined value, to disconnect the compressor-motor 101 from the supply circuit 108, 109. A blower 110 which when in operation supplies cooling air to the condenser and compressor of the refrigerating apparatus (not shown) is connected in parallel relation to the compressor motor. A relay 111 serves to switch on and off the motors 101 and 110. The exciting winding 112 of this relay is connected to a bridge arrangement whose input diagonal is connected to the supply circuit 108, 109. The bridge arrangement contains in its respective branches two resistors 113 and 115 unresponsive to temperature variations, and two temperature-responsive resistors 118 and 119. It is sufficient if only one of the two resistors 118 and 119 is of the temperature responsive type; the use of two such resistors, however, increases considerably the sensitiveness of the arrangement. All four resistors may be of the temperature responsive type, one pair having preferably a negative temperature coefficient and the other pair a positive temperature coefficient. Such bridge arrangements render the control system independent of voltage fluctuations of the supply circuit. The resistors in the bridge connection are preferably in direct heat contact with the evaporator of the refrigerating apparatus (not shown). The output diagonal of the bridge arrangement is connected with the actuating coil 112 of the relay 111. The control system is set so that the relay 111 releases its armature and opens its contact 114 if, as a result of the cooling effect, the bridge is nearly balanced. The control relay is therefore released at a predetermined low temperature of the evaporator. Conversely, if with increasing evaporator temperature a predetermined temperature value is exceeded, the bridge is brought out of balance to such an extent that the relay 111 recloses its contact and again puts the compressor into operation. 116 designates a lamp arranged in the refrigerator cabinet and 117 is the corresponding switch. If desired, another lamp 120 may be employed which, on the one hand, serves as a series resistor for the bridge connection, and on the other hand for indicating whether the refrigerator is inserted in the circuit.

In Fig. 3 is shown another form of connection according to the invention. In this case the bridge arrangement 113, 115, 118, 119 is connected to the supply circuit through a transformer 121. In order to design the control relay 111 in the form of a direct-current relay, the rectifier system 122 is inserted between the bridge and the exciting winding of the relay 111. The transformer 121 is preferably wound so that in the rectifier system 122 only one dry rectifier of the one-disc type need be employed in each branch of the rectifying circuit.

What is claimed is:

1. A system for controlling the power source of refrigerating apparatus, in particular of the compression type, in response to changes in the temperature of the evaporator of said apparatus, comprising a quick-action switch having make and break contacts connected with said power source and a magnet coil for actuating said contacts, circuit means for connecting said coil with a supply network, said circuit means including a bridge arrangement having its diagonal branch connected with said coil and having resistors of different thermal characteristics arranged in its different bridge branches, at least one of said resistors consisting of a body of temperature-responsive resistance having a sharply bent characteristic to effect a sudden change of resistance at a given temperature, said body being arranged in direct heat contact with said evaporator for controlling said switch in response to variations in the temperature of the evaporator by varying the current passing from the supply network through said bridge arrangement to said coil.

2. In a compression refrigerator a system for controlling the supply of energy from an alternating current source to the compressor motor in dependence upon the temperature of the evaporator of said refrigerator, comprising a transformer to be connected with said source, a control relay having make and break contacts connected with said motor, a bridge arrangement having its output diagonal connected with said relay and its input diagonal connected with said transformer, a resistor series connected between said input diagonal and said transformer, said bridge arrangement having resistance bodies of different thermal characteristic arranged in its different bridge branches, at least one of said resistance bodies being temperature responsive and arranged in direct heat contact with said evaporator in order to operate said relay by varying the current in said output diagonal.

3. A system for controlling the power source of refrigerating apparatus, in particular of the compression type, in response to changes in the temperature of the evaporator of said apparatus, comprising a quick-action switch having make and break contacts connected with said power source and a magnet coil for actuating said contacts, circuit means for connecting said coil with a supply network, said circuit means including a bridge arrangement having its diagonal branch connected with said coil and having resistors of different thermal characteristic arranged in its different bridge branches, at least one of said resistors having a temperature-responsive resistance and being arranged in direct heat contact with said evaporator for controlling said switch by varying the current passing from the supply network through said bridge arrangement to said coil, and resistance means connected in series with the input diagonal of said bridge arrangement and consisting of a device for visually indicating the operating condition of the refrigerator.

4. In a compression refrigerator a system for controlling the supply of energy from an alternating current source to the compressor motor in dependence upon the temperature of the evaporator of said refrigerator, comprising a transformer to be connected with said source, a control relay having make and break contacts connected with said motor, said relay having a direct-current actuating coil, a bridge arrangement having its input diagonal connected with the secondary of said transformer, a series-connected resistance means arranged between said input diagonal and the secondary of said transformer, rectifier means connected between the output diagonal of said bridge arrangement and said direct-current coil of said relay, said bridge arrangement having resistance bodies of different thermal characteristic arranged in its different bridge branches, at least one of said resistance bodies being temperature responsive and arranged in direct heat contact with said evaporator in order to operate said relay by varying the current in said output diagonal.

5. A system for controlling the power source of refrigerating apparatus in response to changes in the temperature of a cold-producing member of said apparatus, comprising a relay having make and break contacts connected with said power source, circuit means connected with said relay for supplying energizing current to said relay, and a resistor body of temperature-responsive resistance material arranged in heat-conductive contact with said cold-producing member and forming part of said circuit means for controlling said relay by varying said energizing current in accordance with variations in the temperature of the cold-producing member.

6. A system for controlling the power source of refrigerating apparatus in response to changes in the temperature of a cold-producing member of said apparatus, comprising a quick-action switch having make and break contacts connected with said power source and including a magnet coil for actuating said contacts, energizing circuit means connected with said coil, and a resistor of thermonegative resistance material forming part of said circuit means and being series connected with said coil, said resistor being arranged in direct heat contact with said cold-producing member for actuating said switch in accordance with variations in the temperature of the cold-producing member.

7. A system for controlling the power source of refrigerating apparatus in response to changes in the temperature of a cold-producing member of said apparatus, comprising a quick-action switch having make and break contacts connected with said power source and including a magnet coil for actuating said contacts, circuit means for supplying energizing current to said coil, said circuit means including a resistor of temperature-responsive resistance material having a thermonegative and sharply bent resistance-temperature characteristic to effect a sudden change of resistance at a definite temperature, said resistor being arranged in heat-conductive contact with said cold-producing member for controlling said coil to actuate said switch in response to variations in the temperature of said cold-producing member, and a voltage-responsive regulating means connected in series with said resistance body for maintaining a constant voltage across said body.

RUDOLF HINTZE.
WILHELM LEHFELDT.